US008693971B1

(12) United States Patent
Balraj et al.

(10) Patent No.: US 8,693,971 B1
(45) Date of Patent: Apr. 8, 2014

(54) RECEIVER, RECEIVER CIRCUITS, AND METHODS FOR PROVIDING AN INTERFERENCE-REDUCED SIGNAL

(71) Applicants: Rajarajan Balraj, Duesseldorf (DE); Biljana Badic, Duesseldorf (DE); Tobias Scholand, Muelheim (DE)

(72) Inventors: Rajarajan Balraj, Duesseldorf (DE); Biljana Badic, Duesseldorf (DE); Tobias Scholand, Muelheim (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/707,818

(22) Filed: Dec. 7, 2012

(51) Int. Cl.
*H04B 1/10* (2006.01)
(52) U.S. Cl.
USPC ....... 455/296; 455/501; 455/63.1; 455/114.2; 455/130; 375/216; 375/346
(58) Field of Classification Search
USPC .......... 455/501, 63.1, 114.1, 114.2, 130, 296, 455/509; 375/316, 346
See application file for complete search history.

(56) References Cited

U.S. PATENT DOCUMENTS

| 2012/0250642 | A1* | 10/2012 | Qu et al. | 370/329 |
| 2012/0275400 | A1* | 11/2012 | Chen et al. | 370/329 |
| 2012/0307768 | A1* | 12/2012 | Xu et al. | 370/329 |

OTHER PUBLICATIONS

3GPP 36.213, "Evolved Universal Terrestrial Radio Access (E-UTRA); Physical layer procedures (Release 10)," Sophia Antipolis, Technical Specification 36.213 v10.0.1, Mar. 2012. 127 Pages.
3GPP RI-103892, DMRS for MU-MIMO, Huawei, 3GPP TSG Ran WG1#61bis, Jul. 2010. 11 Pages.
3GPP R1-103592, Performance study of MU-MIMO with quasi-orthogonal DMRS and orthogonal DMRS, ZTE, 3GPP TSG RAN WG1 Meeting #61bis, Jul. 2010. 6 Pages.

* cited by examiner

*Primary Examiner* — Tuan Pham
(74) *Attorney, Agent, or Firm* — Eschweller & Associates, LLC

(57) ABSTRACT

A receiver is configured to receive a receive signal including a plurality of signal components, each signal component indicating a channel of an antenna port and an associated scrambling sequence, wherein a first one of the channels indicated by a first one of the signal components which is based on a first scrambling sequence is allocated to the receiver for data reception and a second one of the channels indicated by a second one of the signal components which is based on a second scrambling sequence different from the first scrambling sequence is interfering with the allocated channel. The receiver includes an interference reduction unit configured to combine an estimate of the first one of the signal components and an estimate of the second one of the signal components to provide an interference-reduced signal.

21 Claims, 8 Drawing Sheets

RECEIVER, RECEIVER CIRCUITS, AND METHODS FOR PROVIDING AN INTERFERENCE-REDUCED SIGNAL

FIELD

This invention relates to mobile communications. In particular, the invention relates to a receiver, receiver circuits, and methods for providing an interference-reduced signal.

BACKGROUND

Components of mobile communications systems may communicate via different channels. During a communication interference may occur between these channels. A receiver, receiver circuits, and methods performed by the same constantly have to be improved. In particular, it may be desirable to provide a receiver, receiver circuits, and methods that provide an improved reduction of occurring interference.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
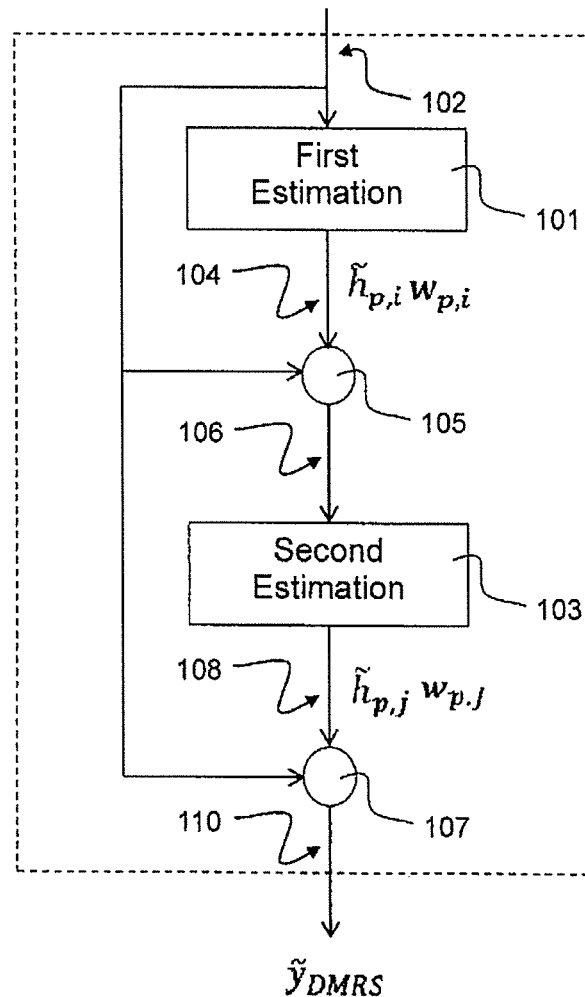
FIG. 1 is a block diagram of a receiver 100 providing an interference-reduced signal $\tilde{y}_{DMRS}$.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations may be used in this specification:

| | |
|---|---|
| AP: | Antenna Port, |
| BER: | Bit Error Rate, |
| CoMP: | Cooperative Multi Point, |
| DMRS: | Demodulation Reference Signal, |
| DMRS-IC: | Demodulation Reference Signal Interference Cancellation, |
| HetNet: | Heterogeneous Networks, |
| ID: | Identifier (with reference to scrambling), |
| IRC: | Interference Rejection Combining, |
| LTE: | Long Term Evolution, |
| LTE-A: | LTE Advanced, Release 10 and higher Releases of LTE, |
| MIMO: | Multi Input Multi Output, |
| MMSE: | Minimum Mean Square Error, |
| MU-MIMO: | Multi User MIMO, |
| QAM: | Quadrature Amplitude Modulation, |
| RF: | Radio Frequency, |
| SNR: | Signal-to-Noise Ratio, |
| TM: | Transmission Mode, |
| UE: | User Equipment. |

The methods and devices described herein may be based on a reception of receive signals including a plurality of signal components, the signal components indicating a channel of an antenna port and an associated scrambling sequence. It is understood that comments made in connection with a described device may also hold true for a corresponding method and vice versa. For example, if a specific method act is described, a corresponding device may include a unit to perform the described method act, even if such a unit is not explicitly described or illustrated in the figures. Similarly, if a specific unit of a device performing a method act is described, a corresponding method may perform this method act, even if such a method is not explicitly described or illustrated in the figures. Further, it is understood that the features of the various exemplary aspects described herein may be combined with each other, unless specifically noted otherwise.

The devices and methods described herein may be implemented in wireless communication networks, in particular communication networks based on an LTE and/or OFDM standard. The methods and devices described below may further be implemented in a base station (NodeB, eNodeB) or a mobile device (or mobile station or User Equipment (UE). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices and methods described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The devices and methods described hereinafter may be designed to implement mobile standards such as e.g. the Long Term Evolution (LTE) standard. LTE (Long Term Evolution), marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements denoted as LTE-Advanced or LTE-A and described in Releases 9, 10 and 11. Physical layer procedures for the evolved universal terrestrial radio access of LTE Release 10 are e.g. defined by technical specification 3GPP TS 36.213, e.g. version 10.5.0 or the corresponding ETSI specification TS 136 213 version 10.5.0 (2012 March).

The devices and methods described herein may be based on MIMO. MIMO wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which is described by the channel matrices between respective antennas of the transmitter and respective antennas of the receiver.

MIMO systems may be used to improve the robustness of data transmission or to increase data rates. Typically, a MIMO system may include m transmit antennas and n receive antennas. The receiver may receive a signal y that may result when an input signal vector x is multiplied by the transmission matrix H according to $y=H*x$. The transmission matrix H may contain the channel impulse responses $h_{nm}$, which may reference the channel between the transmit antenna of index m and the receive antenna of index n. Many MIMO algorithms may be based on the analysis of transmission matrix H characteristics. The rank (of the channel matrix) may define the number of linearly independent rows or columns in H. It may indicate how many independent data streams, also called layers, can be transmitted simultaneously.

The devices and methods described herein may be based on TX diversity schemes. When the same data is transmitted redundantly over more than one transmit antenna, this may be called TX diversity and the signal-to-noise ratio may be increased. Spacetime codes may be used to generate a redundant signal, e.g. the Alamouti code for two antennas. Different other codes may be available for more than two antennas.

The devices and methods described herein may be based on spatial multiplexing schemes. Spatial multiplexing may increase the data rate. Data may be divided into separate streams, which are then transmitted simultaneously over the same air interface resources. The transmission may include special sections, also called pilots or reference signals that are also known to the receiver. The receiver may perform a channel estimation for each transmit antenna's signal. In a closed-loop method, the receiver may report the channel status to the transmitter via a special feedback channel. This may enable fast reactions change channel circumstances, e.g. adaptation of the number of multiplexed streams. When the data rate is to be increased for a single UE, this is called Single User MIMO (SU-MIMO). When the individual streams are assigned to various users, this is called Multi User MIMO (MU-MIMO).

MIMO may offer a higher transmission rate for the same bandwidth using spatial multiplexing with parallel data streams. The transmitter may send data streams in parallel on the same frequency from multiple antennas. The receiver may detect the signals and separate these signals into spatial streams. The MIMO channel model may be described by a channel matrix including i rows and j columns of channel coefficients in the time or in the frequency domain from transmit antenna j to receive antenna i. MIMO may enable transmission of independent sub-channels through space. The data stream to be transmitted may be converted into two or more parallel streams, depending on the number of Tx antennas. Predistortion may be applied. The predistortion circuit may inversely model the output amplifier's gain and phase characteristics and, when combined with the amplifier, may produce an overall system that may be more linear and may reduce the amplifier's distortion. Equalization is an inverse process to predistortion and may restore signal characteristics.

The devices and methods described herein may be based on Orthogonal Frequency Division Multiplexing (OFDM). In the downlink, Orthogonal Frequency Division Multiplex Access (OFDMA) may be selected as the air-interface for LTE. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a frequency-division multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as QAM or PSK) at a low symbol rate, maintaining total data rates similar to conventional single-carrier modulation schemes in the same bandwidth. OFDM may be essentially identical to coded OFDM (COFDM) and discrete multi-tone modulation (DMT). OFDM communication systems do not necessarily rely on increased symbol rates in order to achieve higher data rates. Transmission by means of OFDM may be a particular form of Multi-Carrier Modulation (MCM), i.e. a parallel transmission method which may divide an RF channel into several narrower bandwidth subcarriers.

The devices and methods described herein may be based on antenna ports. From the LTE specification point of view, 1, 2 or 4 physical antennas may be used to simultaneously transmit a Downlink signal. From the implementation point of view, there may be more antennas used for beamforming, e.g. 4, 8 or possibly more. Antenna ports may be seen as logical entities. They do not necessarily have to map 1:1 to physical antennas. They may be divided into the following groups: Ports 0-3 may be cell-specific and may be used for DL MIMO, Port 4 may be MBSFN specific and may be used for MBSFN transmission, Port 5 may be UE specific and may be used for beamforming to a single UE using all antennas, Ports 7 and 8 may be UE specific and may be used for dual layer beamforming assigned to a single UE (single-user MIMO) or the two layers may be assigned to two separate UEs (multi-user MIMO). The physical antennas may be dynamically assigned to ports in the time domain, per slot. Cell specific ports and the UE specific port usually cannot be simultaneously used, i.e. a usage usually has to be time-multiplexed.

The devices and methods described herein may be based on resource blocks (RB) and resource elements (RE). In LTE, a radio bearer concept is replaced by a Resource Block (RB) set concept. A set of RBs may be a logical concept of a bearer over the radio interface. Each resource block may comprise consecutive subcarriers. Resource blocks may be two dimensional (time-frequency) units with a set of subcarriers and time slots. The smallest time-frequency unit for downlink transmission may be called a resource element. A group of contiguous subcarriers and symbols may form an RB. Data may be allocated to each UE in terms of RB. For a frame structure type 1 using normal cyclic prefix, an RB may span 12 consecutive sub-carriers at a sub-carrier spacing of 15 kHz, and 7 consecutive symbols over a slot duration of 0.5 ms.

The devices and methods described herein may be based on reference signals, demodulation reference signals, UE-specific reference signals, layer transmission, and transmission modes. The downlink reference signal structure may be important for channel estimation. It may define the principle signal structure for 1-antenna, 2-antenna, and 4-antenna transmission. Specific pre-defined resource elements in the time-frequency domain may carry the cell-specific reference signal sequence. One resource element may represent the combination of one OFDM symbol in the time domain and one subcarrier in the frequency domain. In transmission mode 8 (TM 8), also UE-specific reference signals (RS) may be used. Since the same elements may be used for both streams, the reference signals may be coded differently so that the UE may distinguish among them. In the downlink, LTE may use technologies such as MIMO to achieve high data rates; in the Release 9 specification of LTE, up to four antennas may be defined in the base station and up to four antennas in the UE.

The devices and methods described herein may be based on scenarios for the downlink that may be reflected in the different transmission modes (TMs). Release 10 describes nine different TMs, which are described in the following.

TM 1 may use only one transmit antenna. TM 2 may use transmit diversity which may be the default MIMO mode. It may send the same information via various antennas, whereby each antenna stream may use different coding and different frequency resources. This may improve the signal-to-noise ratio and may make transmission more robust. For two antennas, a frequency-based version of the Alamouti codes (space frequency block code, SFBC) may be used, while for four antennas, a combination of SFBC and frequency switched transmit diversity (FSTD) may be used. TM 3 may be the open loop spatial multiplexing with CDD. This mode may support spatial multiplexing of two to four layers that may be multiplexed to two to four antennas, respectively, in order to achieve higher data rates. It may require less UE feedback regarding the channel situation and may be used when channel information is missing or when the channel rapidly changes, e.g. for UEs moving with high velocity. TM 4 may support spatial multiplexing with up to four layers that may be multiplexed to up to four antennas, respectively, in order to achieve higher data rates. To permit channel estimation at the receiver, the base station may transmit cell-specific reference signals, distributed over various resource elements and over various time slots. The UE may send a response regarding the channel situation, the response including information about a preferred pre-coding from the defined codebook. This may be accomplished using an index (pre-coding matrix indicators, or PMI) defined in the codebook, a table with possible pre-coding matrices that is known to both sides.

TM 5 may be similar to mode 4, however this transmission mode supports multi-user MIMO transmission. It may use codebook-based closed loop spatial multiplexing, however one layer may be dedicated for one UE. TM 6 is a special type of closed loop spatial multiplexing (TM 4). In contrast to TM 4, only one layer may be used (corresponding to a rank of 1). The UE may estimate the channel and may send the index of the most suitable precoding matrix back to the base station. The base station may send the precoded signal via all antenna ports. The precoding in the baseband of the signals to the different antennas may result in a beamforming effect. TM 7 may use UE-specific reference signals (RS). Both the data and the RS may be transmitted using the same antenna weightings. Because the UE may require only the UE-specific RS for demodulation of the PDSCH, the data transmission for the UE may appear to have been received from only one transmit antenna, and the UE does not necessarily see the actual number of transmit antennas. Therefore, this transmission mode may be also called "single antenna port; port 5". The transmission appears to be transmitted from a single "virtual" antenna port 5.

While Release 8 of the LTE specification defines beamforming with one layer as described above, Release 9 specifies dual-layer beamforming in TM8 for antenna ports 7 and 8. This may permit the base station to weight two layers individually at the antennas so that beamforming may be combined with spatial multiplexing for one or more UEs. As in TM 7, UE-specific reference signals may be also used here. Since the same elements may be used, the reference signals usually have to be coded differently so that the UE may distinguish among them. Since two layers may be used, both layers may be assigned to one UE (single-user MIMO), or the two layers may be assigned to two separate UEs (multi-user MIMO).

TM 9 may be similar to TM 8, but extended to 8-layer transmission to satisfy the requirement for peak spectrum efficiency. Additional reference signals (RS) may be specified which may be UE-specific demodulation RS (DMRS). UE-specific DMRS may be precoded, supporting non-codebook-based precoding. UE-specific DMRS may enable application of enhanced multi-user beamforming such as zero forcing (ZF) for, e.g., 4-by-2 MIMO. A DMRS pattern for higher numbers of layers may be extended from 2-layer format for transmission mode 8 in Rel-9 to e.g. four antenna ports.

The devices and methods described herein may be based on scrambling sequences. A scrambler (or scrambling unit) may be a device that may manipulate a data stream before transmitting, thereby generating a scrambling sequence. The manipulations may be reversed by a descrambler at the receiving side. The scrambler may replace sequences into other sequences without removing undesirable sequences, and as a result it may change the probability of occurrence of vexatious sequences. Information for a specific UE may be distinguished by its UE-identification (ID) specific scrambling sequence. The UE may process each received data element with its UE-ID specific scrambling sequence to detect the data element being intended for the UE. In LTE-Advanced systems, scrambling sequences may be used for specifying antenna port configurations. In TM 8, where up to two layers may be defined, two orthogonal DMRS ports 7 and 8 with the same scrambling sequence may be used resulting in an orthogonal DMRS configuration. In TM 9, where there are more than two layers, and up to four layers may be specified, two orthogonal DMRS ports 7 and 8 with different scrambling sequences are used resulting in a non-orthogonal DMRS. For TM 9, the DMRS scrambling sequences and the antenna port configurations may be defined as follows:

| Antenna Port | OCC |
| --- | --- |
| 7 | [+1 +1 +1 +1] |
| 8 | [+1 −1 +1 −1] |

It can be seen that for transmission for up to 2 layers, the same scrambling sequence may be used with orthogonal codes and thus the pilots may be orthogonal. However, for transmission for more than 2 layers, different scrambling sequences may be used which may cause interference to other layers and may deteriorate the channel estimation performance due to the increased interference between the ports. The orthogonality of the DMRS may not necessarily be held anymore.

The devices and methods described herein may be based on CoMP transmission and reception schemes. CoMP transmission and reception may actually refer to a wide range of techniques that may enable dynamic coordination or transmission and reception with multiple geographically separated eNBs. Its aim may be to enhance the overall system performance, utilize the resources more effectively and improve the end user service quality. One of the key parameters for LTE as a whole, and in particular 4G LTE Advanced may be the high data rates that may be achievable. These data rates may be relatively easy to maintain close to the base station, but as distances increase they may become more difficult to maintain. Obviously the cell edges may be the most challenging. Not only is the signal lower in strength because of the distance from the base station (eNB), but also interference levels from neighboring eNBs may be likely to be higher as the UE will be closer to them. 4G LTE CoMP may require close coordination between a number of geographically separated eNBs. They dynamically may coordinate to provide joint scheduling and transmissions as well as proving joint processing of the received signals. In this way, a UE at the edge of a cell may be able to be served by two or more eNBs to improve signal reception/transmission and may increase throughput particularly under cell edge conditions.

The downlink LTE CoMP may require dynamic coordination amongst several geographically separated eNBs transmitting to the UE. When using Joint processing schemes for transmitting in the downlink, data may be transmitted to the UE simultaneously from a number of different eNBs in order to improve the received signal quality and strength. When using Coordinated scheduling and or beamforming, data to a single UE may be transmitted from one eNB. The scheduling decisions as well as any beams may be coordinated to control the interference that may be generated. The advantage of this approach may be that the requirements for coordination across the backhaul network may be considerably reduced.

The devices and methods described herein may be based on Interference Rejection Combining (IRC). IRC is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be typically based on a minimum mean square error (MMSE) criteria, which may require channel estimation and covariance matrix estimation including the inter-cell interference with high accuracy.

In addition to the above, it is noted that in mobile communications systems based on the LTE-Advanced standards of Release 9 and Release 10, Transmission Mode 9 (TM9) was introduced. This transmission mode may support up to eight layer spatial multiplexing transmission by UE-specific reference signals. Transmission mode 9 also may support MU-MIMO for up to four User Equipments and transmission of up to four layers. In LTE-Advanced Release 10, this transmission mode may rely on the UE-specific reference signals or DMRS, and it may be designed to support transparent MU-MIMO with DMRS ports 7 and 8 with the following two configurations: (1) when there are up to two layers, two orthogonal DMRS ports 7 and 8 with the same scrambling sequence may be used, and this first configuration may result in orthogonal DMRS; and (2) when there are more than two layers, but up to four layers, two orthogonal DMRS ports 7 and 8 with different scrambling sequences may be used, and this second configuration may result in non-orthogonal DMRS.

For the first configuration, the same scrambling sequence may be used with orthogonal codes and thus the pilots may be orthogonal. However, for the second configuration, different scrambling sequences may be used which may cause interference to other layers and deteriorates the channel estimation performance due to the increased interference between the ports. The orthogonality of the DMRS may not necessarily be held anymore.

The actual UE and MU-MIMO system performance in scenarios with non-orthogonal DMRS may be left either with the UE implementation, i.e., by using advanced receiver techniques, or may rely on eNodeB implementation, i.e., by precoding and proper UE pairing. Conventional channel estimation may be applied to obtain separate channel estimates for each UE and Minimum Mean Square Error Interference Rejection Combining (MMSE-IRC) may be applied for detection. However, the non-orthogonal pilots may lead to high estimation errors and performance degradation. It may thus be desirable to provide a receiver operating in scenarios with non-orthogonal DMRS where the performance improvement is significant with respect to known receiver solutions.

FIG. 1 is a block diagram of a receiver 100 providing an interference-reduced signal $\tilde{y}_{DMRS}$. The receiver 100 may include a first estimation unit 101, a second estimation unit 103, a first combination unit 105, and a second combination unit 107. The receiver 100 may receive a receive signal $y_{DMRS}$ 102, e.g. a DMRS, including a first signal component $h_{p,i}w_{p,i}$, a second signal component $h_{p,j}w_{p,j}$, and a noise component n. The first signal component $h_{p,i}w_{p,i}$ may indicate a first channel $h_{p,i}$ of a first antenna port p and an associated first scrambling sequence i, associated with the first antenna port p. The first signal component $h_{p,i}w_{p,i}$ which may be based on the first scrambling sequence i may be allocated to the receiver 100 for data reception.

The second signal component $h_{p,j}w_{p,j}$ may indicate a second channel $h_{p,j}$ of the first antenna port p and an associated second scrambling sequence j, also associated with the first antenna port p. The second signal component $h_{p,j}w_{p,j}$ which may be based on the second scrambling sequence j may be interfering with the allocated first signal component $h_{p,i}w_{p,i}$ resulting in an interference at the receiver 100. The noise component n may be additionally disturbing the receiver 100. The second scrambling sequence j may be different from the first scrambling sequence i.

The first estimation unit 101 may receive the receive signal $y_{DMRS}$ 102 and provides an estimate $\tilde{h}_{p,i}w_{p,i}$ 104 of the first signal component $h_{p,i}w_{p,i}$. The first estimation unit 101 may include a channel estimator for estimating the first channel $h_{p,i}$ and a multiplier for multiplying the estimated first channel $\tilde{h}_{p,i}$ with a known pilot $w_{p,i}$ to obtain the estimate $\tilde{h}_{p,i}w_{p,i}$ 104 of the first signal component $h_{p,i}w_{p,i}$.

The first combination unit 105 may combine the receive signal $y_{DMRS}$ 102 and the estimate $\tilde{h}_{p,i}w_{p,i}$ 104 of the first signal component $h_{p,i}w_{p,i}$ and may provide a first combination signal 106. The combination may be a deduction, i.e., the first estimate $\tilde{h}_{p,i}w_{p,i}$ 104 of the first signal component $h_{p,i}w_{p,i}$ may be deducted (or subtracted) from the receive signal $y_{DMRS}$ 102 in order to reduce or cancel the first signal component.

The second estimation unit 103 may receive the first combination signal 106 and may provide an estimate $\tilde{h}_{p,j}w_{p,j}$ 108 of the second signal component $h_{p,j}w_{p,j}$. The second estimation unit 103 may include a channel estimator for estimating the second channel $h_{p,j}$ and a multiplier for multiplying the estimated second channel $\tilde{h}_{p,j}$ with a known pilot $w_{p,j}$ to obtain the estimate $\tilde{h}_{p,j}w_{p,j}$ 108 of the second signal component $h_{p,j}w_{p,j}$.

The second combination unit 107 may combine the receive signal $y_{DMRS}$ 102 and the estimate $\tilde{h}_{p,j}w_{p,j}$ 108 of the second signal component $h_{p,i}w_{p,i}$ and may provide a second combination signal 110 which may correspond to the interference-reduced signal $\tilde{y}_{DMRS}$ provided by the receiver 100. The combination may be a deduction, i.e., the estimate $\tilde{h}_{p,j}w_{p,j}$ 108 of the second signal component $h_{p,i}w_{p,i}$ may be deducted or subtracted from the receive signal $y_{DMRS}$ 102 in order to reduce or cancel the interference.

The first estimation unit 101 may be used for providing the first estimate $\tilde{h}_{p,i}w_{p,i}$ 104 of the first signal component $h_{p,i}w_{p,i}$. That first signal component $h_{p,i}w_{p,i}$ which may be based on the first scrambling sequence i may be allocated to the receiver 100 for data reception. Thus, the first combination signal 106 may represent the receive signal without the first signal component. As the first signal component may be the signal component in the receive signal which may be allocated to the receiver, the first combination signal may represent the remaining receive signal components which may be interference and noise. The second estimation unit 103 may then estimate the channel based on the second signal component without being influenced by the first signal component in the receive signal. Therefore, estimation of the second estimation unit 103 may be improved. The first estimation unit 101 may e.g. use an MMSE scheme for estimating the first signal component $h_{p,i}w_{p,i}$. The second estimation unit 103 may use e.g. an MMSE scheme for estimating the second signal component $h_{p,i}w_{p,i}$.

The receiver 100 may include further estimation units not depicted in FIG. 1. At least one further estimation unit may be arranged in parallel to the first estimation unit 101 receiving the receive signal $y_{DMRS}$ 102 and providing an estimate of a further signal component of the receive signal not depicted in FIG. 1. This further signal component may be an orthogonal signal component of the first signal component, i.e. a signal component including the same scrambling sequence, for example the first scrambling sequence. The estimate of the further signal component may be provided to the first combination unit 105 to be combined with the other input signals of the first combination unit 105 for providing the first combination signal 106.

At least one further estimation unit may be arranged in parallel to the second estimation unit 103 receiving the first combination signal 106 and providing an estimate of a further signal component of the receive signal not depicted in FIG. 1. This further signal component may be an orthogonal signal component of the second signal component, i.e. a signal component including the same scrambling sequence, for example the second scrambling sequence. The estimate of the further signal component may be provided to the second combination unit 107 to be combined with the other input signals of the second combination unit 107 for providing the second combination signal 110.

At least one further estimation unit may be arranged in series with to the first 101 and second 103 estimation units receiving the second combination signal 110 and providing an estimate of a further signal component of the receive signal not depicted in FIG. 1. This further signal component may be a non-orthogonal signal component of the first and second signal components, i.e. a signal component including a different scrambling sequence, for example a third scrambling sequence different from the first and second scrambling sequences. The estimate of the further signal component may be provided to a further combination unit to be combined with the receive signal for providing a further combination signal.

A plurality of parallel and sequential estimation units and combination units may be used for reducing interference of a receive signal including a plurality of signal components. For example, a receive signal including four signal components may be processed by a receiver having four estimation and combination units, a receive signal including six signal components may be processed by a receiver having six estimation and combination units, etc. An exemplary implementation for a receiver having four estimation and combination units is depicted in FIG. 2.

The receiver 200 may provide an enhanced DMRS interference cancellation scheme that may improve the orthogonality for higher layer MU-MIMO in LTE-Advanced. The associated scheme described herein may overcome the constraint of not-orthogonal antenna ports, e.g. in LTE-Advanced. This novel scheme may result in more accurate interference cancellation and channel estimation, it may improve the performance of higher layer MU-MIMO in scenarios where orthogonality between ports has to be preserved in order to guarantee the robust system performance.

The enhanced DMRS interference cancellation scheme described herein may overcome constraints, e.g. the decision to not-introduce new antenna ports and thus keeping DMRS overhead low. The enhanced DMRS interference cancellation scheme may lead to improved inter-cell orthogonality and thus may be applied in CoMP and HetNets where a high probability may exist to schedule large number of layers in MU-MIMO transmission because of the increased number of joint transmitting antennas. The receiver 100 may be applied in CoMP and HetNets scenarios which may be important features being considered for LTE Release 11.

Figure 2:
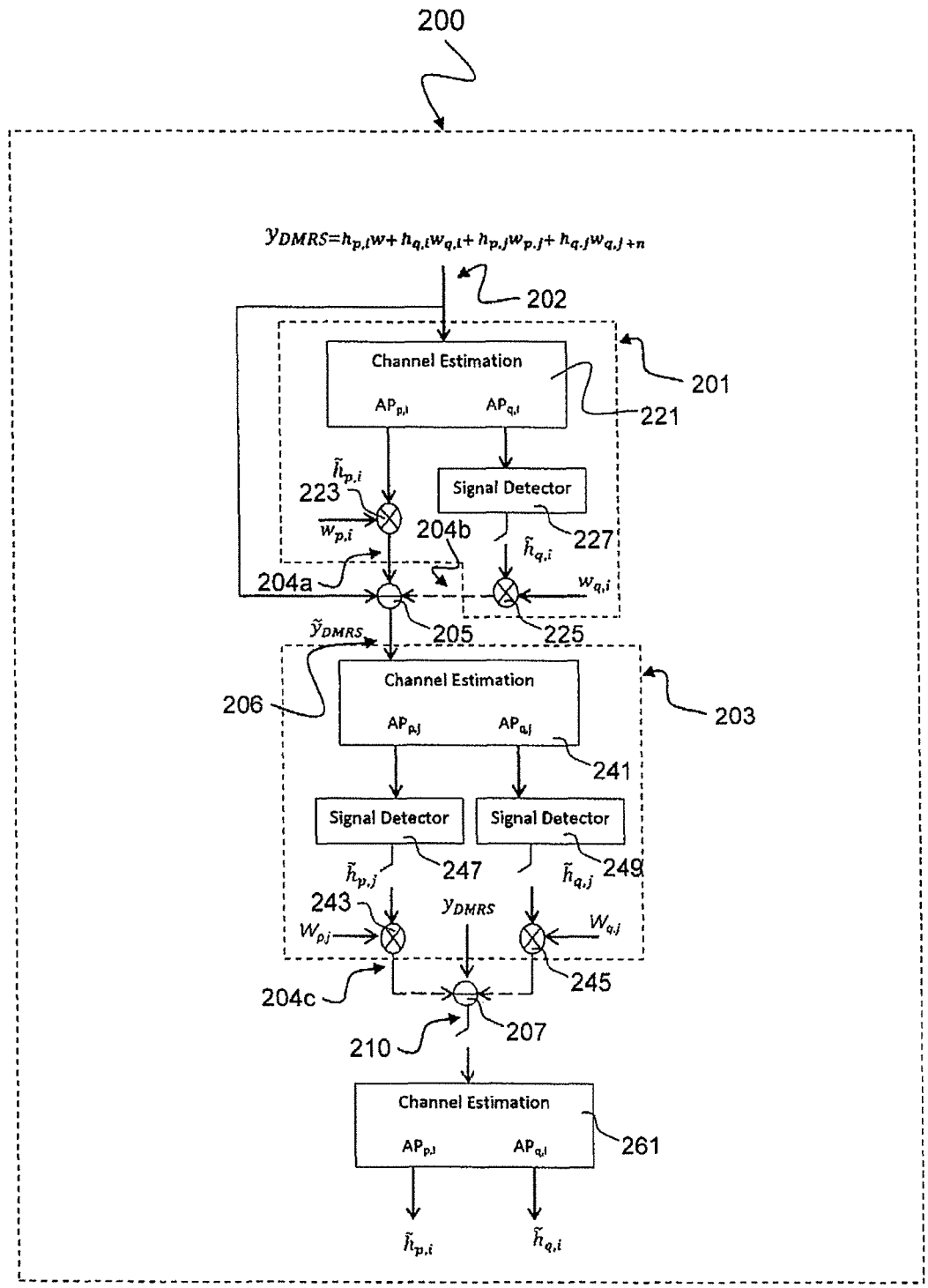
FIG. 2 is a block diagram of a DMRS interference cancellation receiver circuit 200.

FIG. 2 is a block diagram of a DMRS interference cancellation receiver circuit 200. The receiver circuit 200 may include a first estimation unit 201, a second estimation unit 203, a first combination unit 205, and a second combination unit 207. The receiver circuit 200 may receive a receive signal $y_{DMRS}$ 202, e.g. a DMRS, including a first signal component $h_{p,i}w_{p,i}$, a second signal component $h_{p,j}w_{p,j}$, a third signal component $h_{q,i}w_{q,i}$, a fourth signal component $h_{q,j}w_{q,j}$, and a noise component n. The first signal component $h_{p,i}w_{p,i}$ may indicate a first channel $h_{p,i}$ of a first antenna port p and an associated first scrambling sequence i, associated with the first antenna port p. The first signal component $h_{p,i}w_{p,i}$ which may be based on the first scrambling sequence i may be allocated to the receiver circuit 200 for data reception.

The second signal component $h_{p,j}w_{p,j}$ may indicate a second channel $h_{p,j}$ of the first antenna port p and an associated second scrambling sequence j, also associated with the first antenna port p. The second signal component $h_{p,j}w_{p,j}$ which may be based on the second scrambling sequence j may be interfering with the allocated first signal component $h_{p,i}w_{p,i}$ resulting in an interference at the receiver circuit 200. The third signal component $h_{q,i}w_{p,i}$ may indicate a third channel $h_{q,i}$ of the second antenna port q and an associated first scrambling sequence i associated with the second antenna port q. The third signal component $h_{q,i}w_{q,i}$ which may be based on the first scrambling sequence i may be interfering with the allocated first signal component $h_{p,i}w_{p,i}$ resulting in an interference at the receiver circuit 200. However, the third signal component may be orthogonal to the first signal component as both signal components may use the same scrambling sequence i.

The fourth signal component $h_{q,j}w_{q,j}$ may indicate a fourth channel $h_{q,j}$ of the second antenna port q and an associated second scrambling sequence j associated with the second antenna port q. The fourth signal component $h_{q,j}w_{q,j}$ which may be based on the second scrambling sequence j may be interfering with the allocated first signal component $h_{p,i}w_{p,i}$ resulting in an interference at the receiver circuit 200. The fourth signal component may be non-orthogonal to the first signal component, but it may be orthogonal to the second signal component as both, the second and the fourth signal components may use the same scrambling sequence j.

The first estimation unit 201 may receive the receive signal $y_{DMRS}$ 202 and may provide an estimate $\tilde{h}_{p,i}w_{p,i}$ 204a of the first signal component $h_{p,i}w_{p,i}$ and an estimate $\tilde{h}_{q,i}w_{q,i}$ 204b of the third signal component $h_{q,i}w_{q,i}$. The first estimation unit 201 may include a channel estimator 221 for estimating the first channel $h_{p,i}$ and the third channel $h_{q,i}$. The first estimation unit 201 may include a first multiplier 223 for multiplying the estimated first channel $\hat{h}_{p,i}$ with a known first pilot $w_{p,i}$ to obtain the estimate $\tilde{h}_{p,i}w_{p,i}$ 204a of the first signal component $h_{p,i}w_{p,i}$. The first estimation unit 201 may include a first signal detector 227 for detecting a presence of the third signal component in the receive signal. The detection may be based on a power evaluation of the receive signal and a comparison against a threshold. If the first signal detector detects the third signal component in the receive signal, the estimated third channel $\hat{h}_{q,i}$ may be switched to a second multiplier 225 for multiplying the estimated third channel $\hat{h}_{q,i}$ with a known third pilot $w_{q,i}$ to obtain the estimate $\tilde{h}_{q,i}w_{q,i}$ 204b of the third signal component $h_{q,i}w_{q,i}$.

The first combination unit 205 may combine the receive signal $y_{DMRS}$ 102 and the estimates $\tilde{h}_{p,i}w_{p,i}$ 204a and $\tilde{h}_{q,i}w_{q,i}$ 204b of the first signal component $h_{p,i}w_{p,i}$ and the third signal component $h_{q,i}w_{q,i}$ and may provide a first combination signal 206. The combination may be a deduction, i.e., the estimates $\tilde{h}_{p,i}w_{p,i}$ 204a and $\tilde{h}_{q,i}w_{q,i}$ 204b of the first signal component $h_{p,i}w_{p,i}$ and the third signal component $h_{q,i}w_{q,i}$ may be deducted or subtracted from the receive signal $y_{DMRS}$ 202 in order to reduce or cancel the first and third signal components from the receive signal.

The second estimation unit 203 may receive the first combination signal 206 and may provide an estimate $\tilde{h}_{p,j}w_{p,j}$ 204c of the second signal component $h_{p,j}w_{p,j}$ and an estimate $\tilde{h}_{q,j}w_{q,j}$ of the fourth signal component $h_{q,j}w_{q,j}$. The second estimation unit 203 may include a channel estimator 241 for estimating the second channel $h_{p,j}$ and the fourth channel $h_{q,j}$. The second estimation unit 203 may include a first signal detector 247 for detecting a presence of the second signal component in the receive signal. The detection may be based on a power evaluation of the received signal and a comparison against a threshold. If the first signal detector 247 detects the second signal component in the received signal, the estimated second channel $\hat{h}_{p,j}$ may be switched to a first multiplier 243 for multiplying the estimated second channel $\hat{h}_{p,j}$ with a known second pilot $w_{p,j}$ to obtain the estimate $\tilde{h}_{p,j}w_{p,j}$ 204c of the second signal component $h_{p,j}w_{p,j}$. The second estimation unit 203 may include a second signal detector 249 for detecting a presence of the fourth signal component in the received signal. The detection may be based on a power evaluation of the received signal and a comparison against a threshold. If the second signal detector 249 detects the fourth signal component in the received signal, the estimated fourth channel $\hat{h}_{q,j}$ may be switched to a second multiplier 245 for multiplying the estimated fourth channel $\hat{h}_{q,j}$ with a known fourth pilot $w_{q,j}$ to obtain the estimate $\tilde{h}_{q,j}w_{q,j}$ 204d of the fourth signal component $h_{q,j}w_{q,j}$.

The second combination unit 207 may combine the receive signal $y_{DMRS}$ 202 and the estimates $\tilde{h}_{p,j}w_{p,j}$ 204c and $\tilde{h}_{q,j}w_{q,j}$ 204d of the second signal component $h_{p,j}w_{p,j}$ and the fourth signal component $h_{q,j}w_{q,j}$ and may provide a second combination signal 210 which may correspond to the interference-reduced signal 210 provided by the receiver circuit 200. The combination may be a deduction, i.e., the estimates $\tilde{h}_{p,j}w_{p,j}$ 204c and $\tilde{h}_{q,j}w_{q,j}$ 204d of the second signal component $h_{p,j}w_{p,j}$ and the fourth signal component $h_{q,j}w_{q,j}$ may be deducted or subtracted from the receive signal $y_{DMRS}$ 202 in order to reduce or cancel the second and fourth signal components from the receive signal.

The first estimation unit 201 may be used for providing the estimate $\tilde{h}_{p,i}w_{p,i}$ 204a of the first signal component $h_{p,i}w_{p,i}$ and the estimate $\tilde{h}_{q,i}w_{q,i}$ 204b of the third signal component $h_{p,i}w_{p,i}$. The first signal component $h_{p,i}w_{p,i}$ which may be based on the first scrambling sequence i may be allocated to the receiver 100 for data reception and the third signal component $h_{p,i}w_{p,i}$ may be an interfering component. The first combination signal 206 thus may represent the receive signal without the first and third signal components. The second estimation unit 203 may then estimate the channel based on the second and fourth signal components without being influenced by the first and third signal components in the receive signal. Therefore, estimation of the second estimation unit 203 may be improved.

The receiver circuit 200 may further include a third channel estimator 261 for estimating the first channel $\hat{h}_{p,i}$ and the third channel $\hat{h}_{q,i}$ based on the second combination signal 210, i.e. based on the interference-reduced signal 210. Therefore, the receiver circuit 200 may provide an enhanced interference-cancellation based channel estimation of the first channel $\hat{h}_{p,i}$, which may be also denoted as the own channel, as the first signal component may be allocated to the receiver circuit for data reception.

The signal detectors 227, 247, 249 may include SNR estimators for estimating a signal-to-noise ratio of an input signal. If the SNR of the input signal is above a threshold, the input signal may be detected and the subsequent switch may be closed for switching-through the input signal. The signal detectors 227, 247, 249 may include constant false alarm detectors for detecting the input signal depending on a false alarm threshold. The channel estimators may include MMSE estimators.

The configuration of the receiver circuit 200 described above may represent a single-layer MU-MIMO scenario, where one signal component of the receive signal may be allocated to the receiver circuit 200 for data reception and the other signal components of the receive signal may be interfering signal components.

In a dual-layer MU-MIMO scenario, the receiver circuit 200 may be configured for allocating the third signal component for data reception. In this scenario, the third signal component may not be an interfering signal component, it may represent a second layer or data stream allocated to the receiver circuit 200 additionally to the first signal component representing the first layer.

The receiver circuit 200 may provide an enhanced DMRS interference cancellation scheme that may improve the orthogonality for higher layer MU-MIMO in LTE-Advanced. The scheme described herein may overcome the constraint of not-orthogonal antenna ports, e.g. in LTE-Advanced. This novel scheme may result in more accurate interference cancellation and channel estimation, it may improve the performance of higher layer MU-MIMO in scenarios where orthogonality between ports has to be preserved in order to guarantee the robust system performance.

The enhanced DMRS interference cancellation scheme described here may overcome constraints, e.g. the decision to not-introduce new antenna ports and thus keep DMRS overhead low. The enhanced DMRS interference cancellation scheme may lead to improved inter-cell orthogonality and thus may be applied in CoMP and HetNets where a high probability may exist to schedule large number of layers in MU-MIMO transmission because of the increased number of joint transmitting antennas. The receiver 100 may be applied in CoMP and HetNets scenarios which may be important features being considered for e.g. LTE Release 11.

The first estimation unit 201 may correspond to the first estimation unit 101 as described with respect to FIG. 1. The second estimation unit 203 may correspond to the second estimation unit 103 as described with respect to FIG. 1. The first combination unit 205 may correspond to the first combination unit 105 as described with respect to FIG. 1. The second combination unit 207 may correspond to the second combination unit 107 as described with respect to FIG. 1. The receive signal $y_{DMRS}$ 202 may correspond to the receive signal $y_{DMRS}$ 102 as described with respect to FIG. 1.

In an example, the system function for transmission of DMRS via antenna port (AP) pair $\{p, q\}$ for each scrambling sequence with ID=0 or 1 is $y_{DMRS}$. As depicted in FIG. 2, the antenna ports with the same scrambling ID may be orthogonal, i.e. $AP_{p,i}$ and $AP_{q,i}$ may be orthogonal and $AP_{p,j}$ and $AP_{q,j}$ may be orthogonal, whereas AP groups with different scrambling ID may be non-orthogonal. For example, $AP_{p,i}$ and $AP_{q,j}$ may be non-orthogonal even if they have different orthogonal code cover and scrambling IDs.

$AP_{p,i}$ is an allocated antenna port and the presence of valid signals in the other ports and scrambling sequences may be not known. Then the following method steps may describe the functionality of the receiver circuit 200.

The first action (Act 1) in the estimation process may be to estimate the channel of the antenna ports in the allocated scrambling ID=i, $\tilde{h}_{p,i}$ for the antenna port p and the channel of the antenna port q, $\tilde{h}_{q,i}$. In the second action (Act 2), a signal detector may verify whether a valid signal is present in port q or not. If so, both contributions of the signal (allocated and detected) may be deducted from $y_{DMRS}$. If not, only the known antenna port signal (allocated signal) may be deducted. In the third action (Act 3), a channel estimate may be performed on the other antenna ports $AP_{p,j}$ and $AP_{q,j}$ based on the signal $\tilde{y}_{DMRS}$. In a fourth action (Act 4), the signal detector may verify whether a valid signal is present in ports p and q for the scrambling sequence j or not. If so, contributions of detected signals may be deducted from $y_{DMRS}$. In the fifth action (Act 5), a channel estimate may be performed on scrambling ID=i for both antenna ports p and q.

Figure 3:
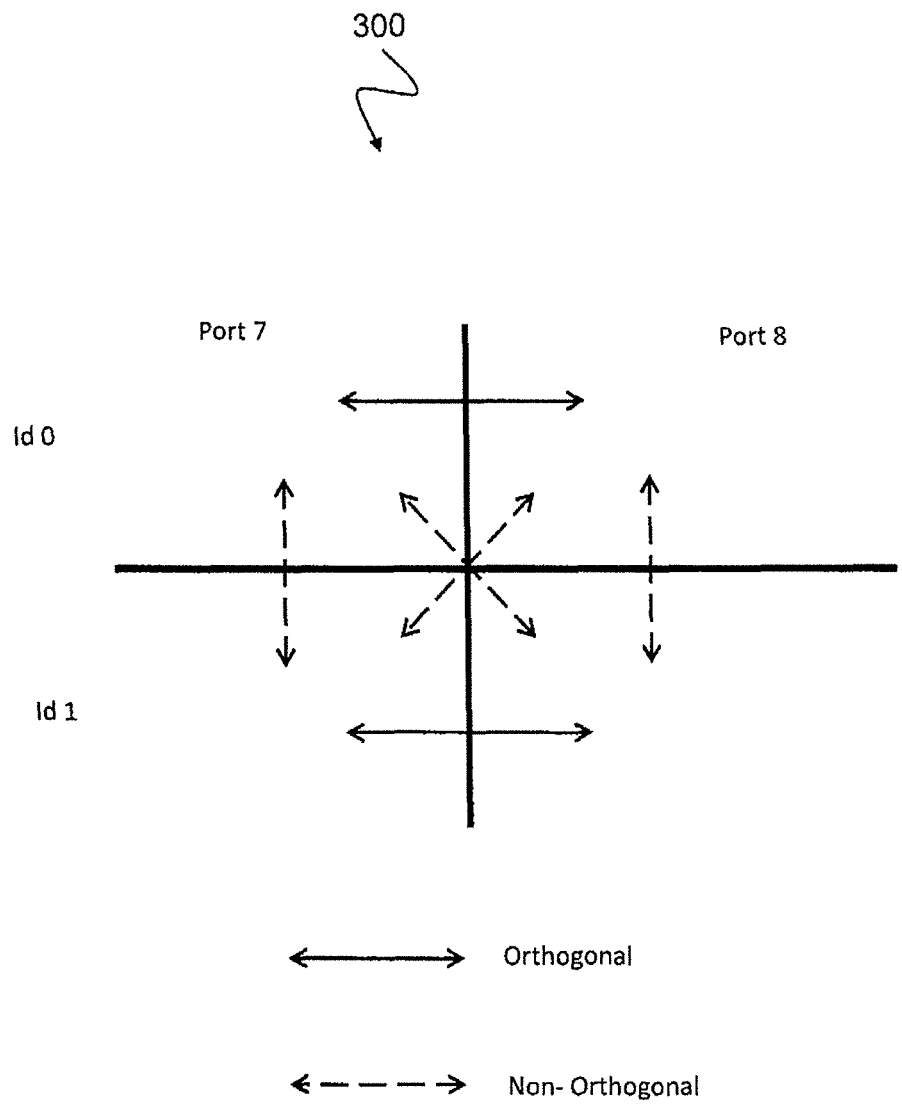
FIG. 3 is a schematic representation of a scrambling sequence and antenna port configuration 300 for the receiver as depicted in FIG. 1.

FIG. 3 is a schematic representation of a scrambling sequence and antenna port configuration for the receiver depicted in FIG. 1. The dashed arrows may denote non-orthogonal antenna port configurations while the solid arrows may denote orthogonal antenna port configurations. An example for the scrambling identifiers (ID) and the antenna ports may be given in the following table.

| Antenna Port | scrambling sequence |
|---|---|
| 7 | [+1 +1 +1 +1] |
| 8 | [+1 −1 +1 −1] |

From FIG. 3, it can be seen that for transmission for up to 2 layers, the same scrambling sequence may be used with orthogonal codes and thus the pilots may be orthogonal. However, for transmission for more than 2 layers, different scrambling sequences may be used which may cause interference to other layers and may deteriorate the channel estimation performance due to the increased interference between the ports. The orthogonality of the DMRS may not necessarily be held anymore. A receiver 100 as described with respect to FIG. 1 or a receiver circuit 200 as described with respect to FIG. 2 may be able to cancel or at least reduce the interference caused by the non-orthogonality and thus may provide an improved channel estimation.

Figure 4:
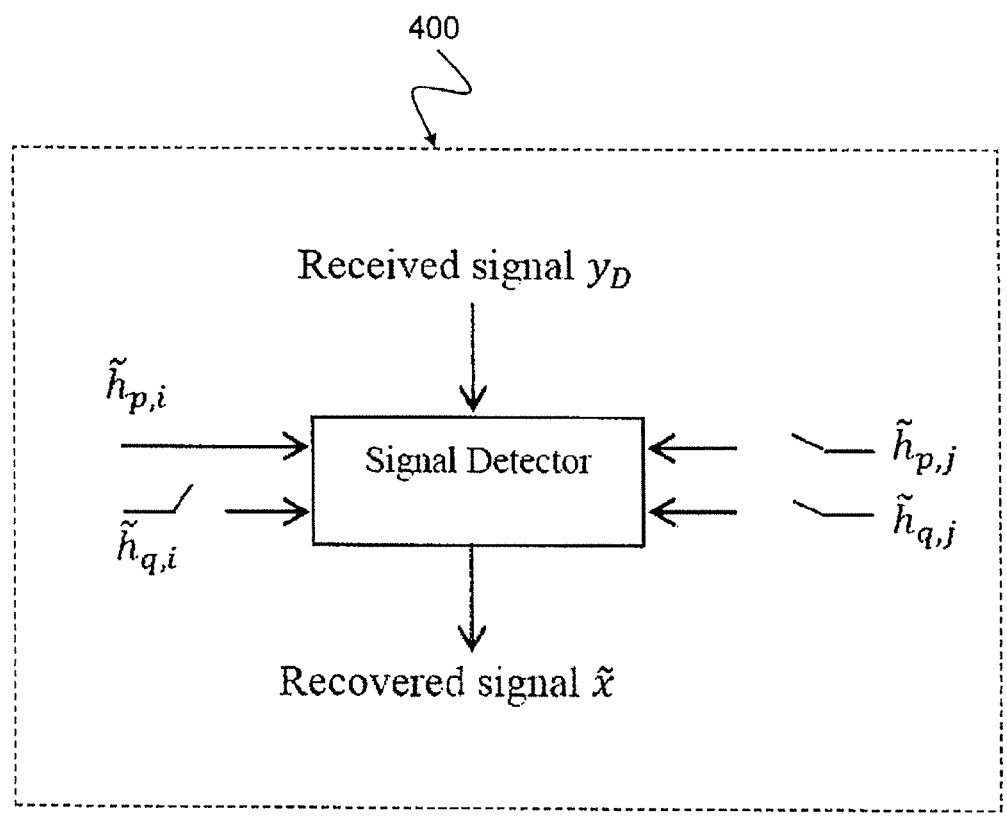
FIG. 4 is a block diagram of an equalizer 400 for equalizing a receive signal by using channel coefficients $\hat{h}_{p,i}, \hat{h}_{p,j}, \hat{h}_{q,i}, \hat{h}_{q,j}$ provided by a receiver as depicted in FIG. 1.

FIG. 4 is a block diagram of an equalizer 400 for equalizing a receive signal $y_D$ by using channel coefficients $\tilde{h}_{p,i}$, $\tilde{h}_{p,j}$, $\tilde{h}_{q,i}$, $\tilde{h}_{q,j}$ which may be provided by a receiver 100 as depicted in FIG. 1 or FIG. 2. After the channel estimation based on DMRS interference cancellation (DMRS-IC) is performed, valid channel estimates $\tilde{h}_{p,i}$, $\tilde{h}_{p,j}$, $\tilde{h}_{q,i}$, $\tilde{h}_{q,j}$ may be used for detection and interference suppression, as shown in FIG. 4. By equalizing the receive signal $y_D$ using the channel estimates $\tilde{h}_{p,i}$, $\tilde{h}_{p,j}$, $\tilde{h}_{q,i}$, $\tilde{h}_{q,j}$ as described above with respect to FIG. 1 or by the receiver circuit 200 as described above with respect to FIG. 2, the equalizer 400 may provide the recovered signal $\tilde{x}$. The equalization may e.g. be based on MMSE.

Figure 5:
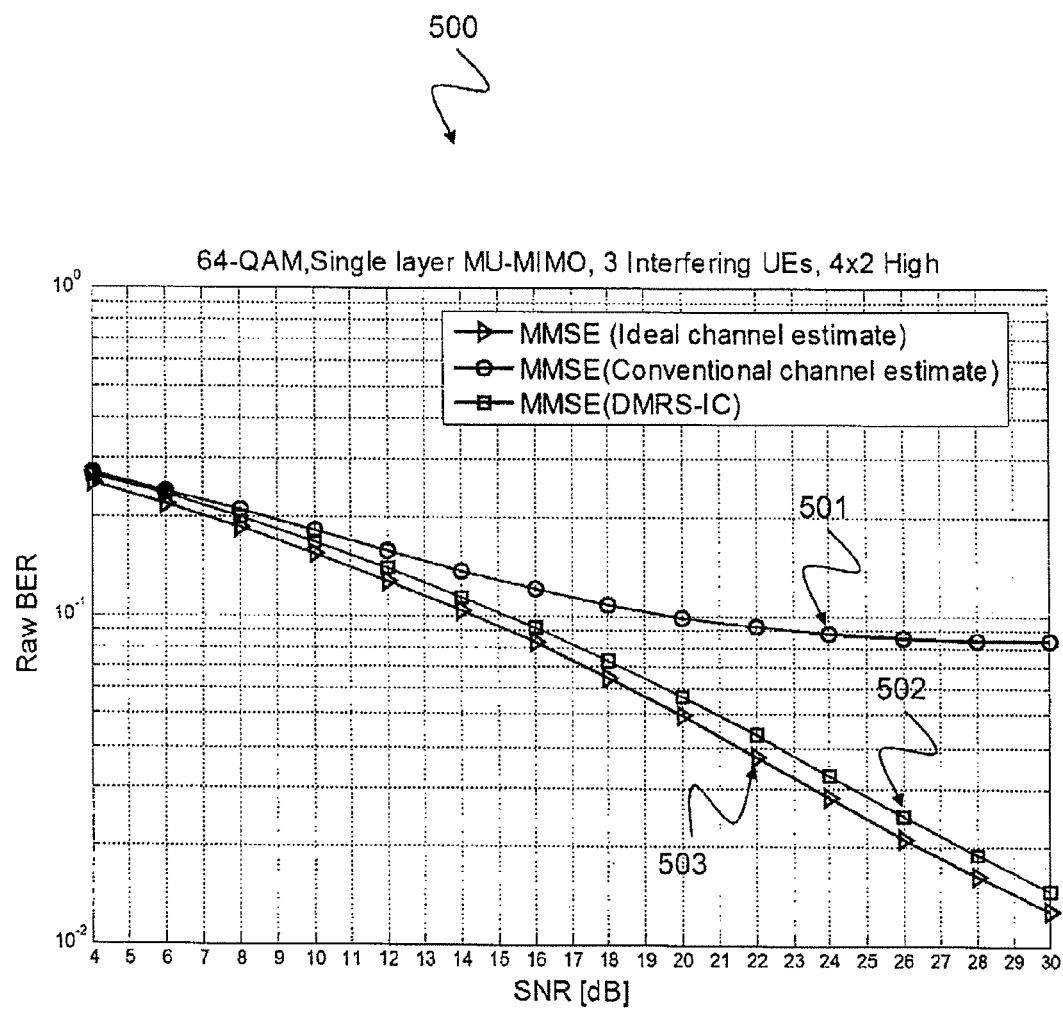
FIG. 5 is a performance diagram 500 illustrating a bit error rate (BER) versus signal-to-noise ratio (SNR) of a DMRS interference cancellation receiver circuit as depicted in FIG. 2 when configured for single-layer MU-MIMO with three interfering User Equipments (UEs).

FIG. 5 is a performance diagram 500 illustrating bit error rate versus SNR of a DMRS interference cancellation receiver circuit 200 as depicted in FIG. 2 when configured for single-layer MU-MIMO with three interfering UEs.

Link level simulations are performed for single layer MU-MIMO transmission. Four users are using one layer, where three users are interfering one user. The raw Bit Error Ratio (BER) performance of 4×2 single layer MU-MIMO is shown in FIG. 5 for 64QAM in high spatially correlated channels. That is, 4 antennas are used by the transmitting unit while 2 antennas are used by the receiving unit. The results are compared with the conventional channel estimate of DMRS. The first curve 501 illustrates the performance of a conventional channel estimate for MMSE, the second curve 502 illustrates the performance of a DMRS interference cancellation receiver circuit 200 as described above with respect to FIG. 2 and the third curve 503 illustrates the performance of an ideal channel estimation. As can be seen from the results, the performance 502 of the DMRS interference cancellation receiver circuit 200 outperforms the conventional channel estimation by up to 4 dB at BER=$10^{-1}$. The BER performance is close to the performance 503 of the ideal channel estimation.

Figure 6:
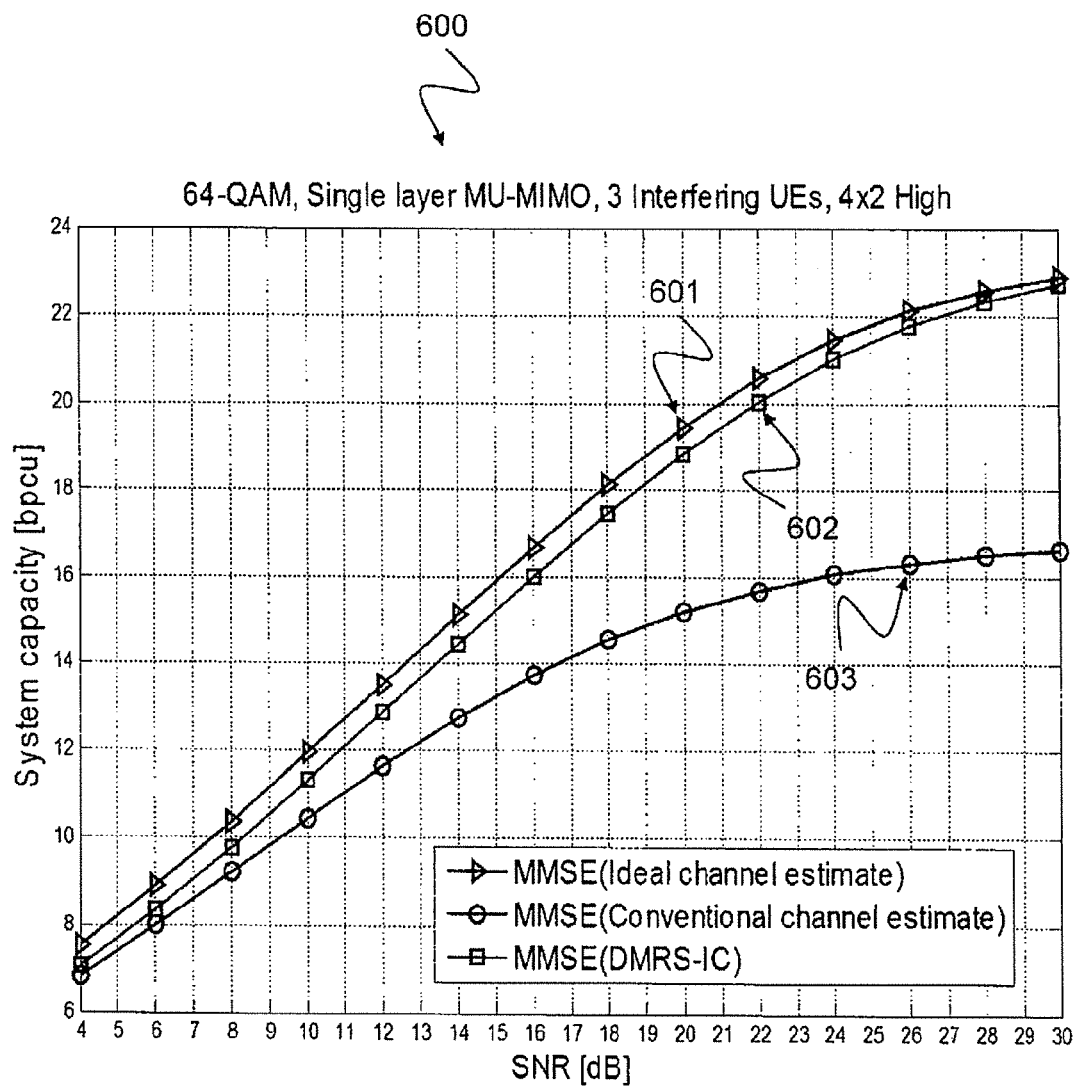
FIG. 6 is a performance diagram 600 illustrating a system capacity versus signal-to-noise ratio (SNR) of a DMRS interference cancellation receiver circuit as depicted in FIG. 2 when configured for single-layer MU-MIMO with three interfering UEs.

FIG. 6 is a system capacity diagram 600 illustrating system capacity versus SNR of a DMRS interference cancellation receiver circuit 200 as depicted in FIG. 2 when configured for single-layer MU-MIMO with three interfering UEs. FIG. 6 shows the system capacity measured in bits per use (bpcu) for the same scenario as depicted in FIG. 5. That is, four antennas are used by the transmitting unit while two antennas are used by the receiving unit. The results are compared with the conventional channel estimation. The first curve 601 illustrates the system capacity of an ideal system capacity, the second curve 602 illustrates the system capacity of the DMRS interference cancellation receiver circuit 200 as described above with respect to FIG. 2 and the third curve 603 illustrates the system capacity of a conventional channel estimation. As can be seen from the results, a DMRS interference cancellation receiver circuit's 200 system capacity 602 outperforms the conventional channel estimation 603. The DMRS interference cancellation receiver circuit's 200 system capacity 602 is close to the system capacity 601 of the ideal channel estimation.

Figure 7:
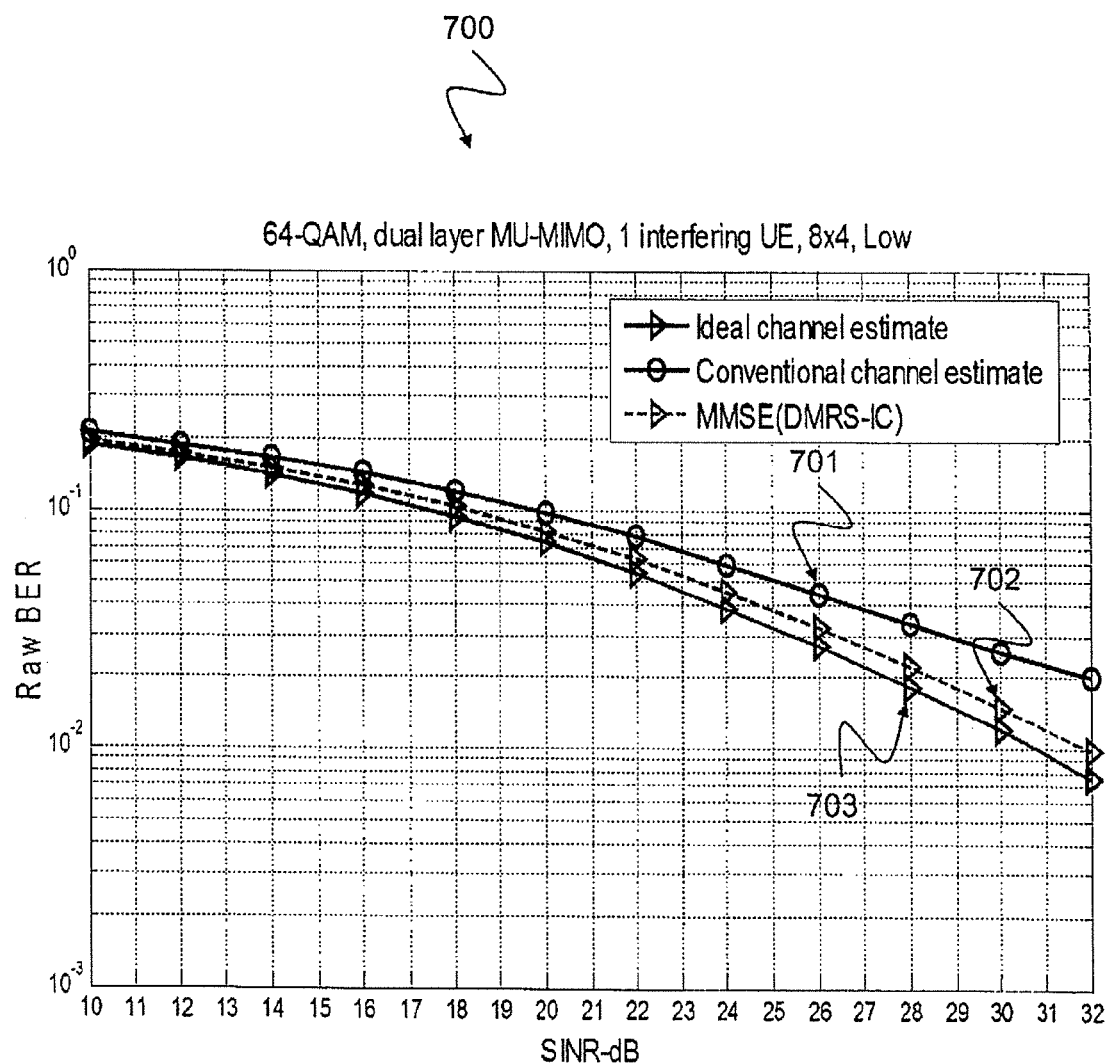
FIG. 7 is a performance diagram 700 illustrating a bit error rate versus signal-to-noise ratio (SNR) of a DMRS interference cancellation receiver circuit as depicted in FIG. 2 when configured for dual-layer MU-MIMO with one interfering UE.

FIG. 7 is a performance diagram 700 illustrating bit error rate versus SNR of a DMRS interference cancellation receiver circuit 200 as depicted in FIG. 2 when configured for dual-layer MU-MIMO with one interfering UE. That is, two users, each of them using two layers or data streams, where each user is interfering the other user, i.e. two interfering layers. The raw Bit Error Ratio (BER) performance of 8×4 dual-layer MU-MIMO is shown in FIG. 5 for 64QAM in low spatially correlated channels. That is, 8 antennas are used by the transmitting unit while 4 antennas are used by the receiving unit.

The first curve 701 illustrates the performance of a conventional channel estimate for MMSE, the second curve 702 illustrates the performance of the DMRS interference cancellation receiver circuit 200 as described above with respect to FIG. 2 and the third curve 703 illustrates the performance of an ideal channel estimation. FIG. 7 illustrates that still significant gains (1.5 to 3 dB in the range $10^{-1}$ to $10^{-2}$) of the DMRS interference cancellation receiver circuit 200 over conventional channel estimation may be observed.

Figure 8:
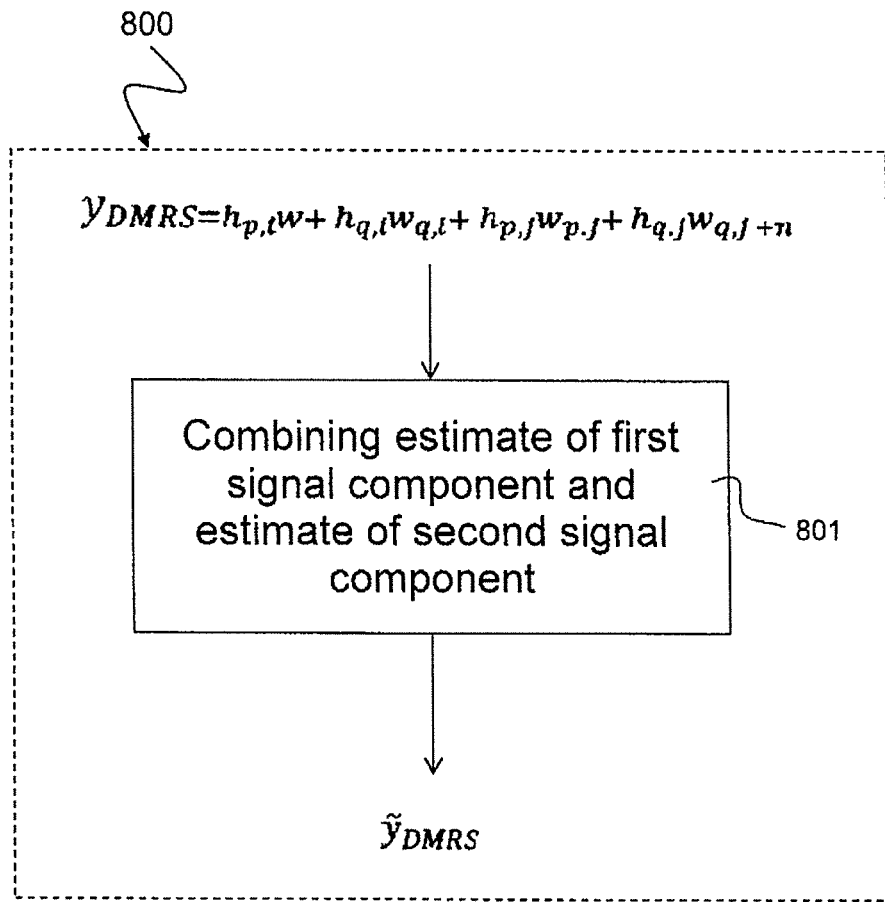
FIG. 8 is a schematic diagram of a method 800 providing an interference-reduced signal $\tilde{y}_{DMRS}$.

FIG. 8 is a schematic diagram of a method 800 providing an interference-reduced signal. The method 800 may be configured for receiving a receive signal $y_{DMRS}$ including a plurality of signal components $h_{p,i}w_{p,i}, h_{q,i}w_{q,i}, h_{p,j}w_{p,j}, h_{q,j}w_{q,j}$, where each signal component may be indicating a channel $h_{p,i}, h_{q,i}, h_{p,j}, h_{q,j}$ of an antenna port p,q and an associated scrambling sequence i,j. A first one $h_{p,i}$ of the channels indicated by a first one $h_{p,i}w_{p,i}$ of the signal components which may be based on a first scrambling sequence i may be allocated for data reception. A second one $h_{p,j}$ of the channels indicated by a second one $h_{p,i}w_{p,i}$ of the signal components which may be based on a second scrambling sequence j different from the first scrambling sequence i may be interfering with the allocated channel $h_{p,i}$. The method 800 may include combining 801 an estimate $\hat{h}_{p,i}w_{p,i}$ of the first one of the signal components and an estimate $\hat{h}_{p,j}w_{p,j}$ of the second one of the signal components to provide an interference-reduced signal. In an example, the method 800 may further include estimating channel coefficients of the allocated channel $h_{p,i}$ based on the interference-reduced signal.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

What is claimed is:

1. A receiver, configured to receive a receive signal comprising a plurality of signal components, wherein each signal component of the plurality of signal components indicates a channel of an antenna port and an associated scrambling sequence, and wherein a first one of the channels indicated by a first one of the signal components which is based on a first scrambling sequence is allocated to the receiver for data reception and a second one of the channels indicated by a second one of the signal components which is based on a second scrambling sequence different from the first scrambling sequence is interfering with the allocated channel, comprising:

an interference reduction unit configured to combine an estimate of the first one of the signal components and an estimate of the second one of the signal components to provide an interference-reduced signal.

2. The receiver of claim 1, further comprising a first channel estimator configured to estimate channel coefficients of the allocated channel based on the interference-reduced signal.

3. The receiver of claim 1, wherein the receive signal comprises a plurality of User Equipment specific reference signals.

4. The receiver of claim 1, wherein the receive signal comprises a plurality of demodulation reference signals.

5. The receiver of claim 1, wherein the first one of the plurality of signal components and the second one of the signal components are non-orthogonal with respect to each other.

6. The receiver of claim 1, further comprising at least two antenna ports for receiving the receive signal.

7. The receiver of claim 6, wherein the at least two antenna ports are based on one of a single layer and a dual layer multi-user multiple input, multiple output (MIMO) transmission.

8. The receiver of claim 6, wherein the at least two antenna ports are based on at least one of LTE transmission modes 8 and 9 or a higher LTE-Advanced transmission mode supporting multi-user or Coordinated Multipoint transmission, or both.

9. The receiver of claim 1, wherein a third one of the channels indicated by a third one of the signal components which is based on the second scrambling sequence and which is transmitted from a different transmission point than the first one of the channels is allocated to the receiver for data reception.

10. The receiver of claim 1, wherein the interference reduction unit comprises another channel estimator configured to determine the estimate of the second one of the signal components based on a combination of the estimate of the first one of the signal components and the receive signal.

11. The receiver of claim 10, wherein the interference reduction unit comprises a first deduction unit configured to combine the estimate of the first one of the signal components and the receive signal by a deduction to form a first combination signal provided to the another channel estimator.

12. The receiver of claim 1, wherein the interference reduction unit is configured to provide the interference-reduced signal based on a combination of the estimate of the second one of the signal components and the receive signal.

13. The receiver of claim 12, wherein the interference reduction unit comprises a second deduction unit configured to combine the estimate of the second one of the signal components and the receive signal by a deduction.

14. The receiver of claim 1, wherein the interference reduction unit comprises a first signal detector configured to detect a third one of the channels indicated by a third one of the signal components which is based on the first scrambling sequence.

15. The receiver of claim 14, wherein the interference reduction unit comprises a first deduction unit configured to deduct the estimate of the first one of the signal components and an estimate of the third one of the signal components from the receive signal.

16. The receiver of claim 15, wherein the interference reduction unit comprises a second signal detector configured to detect a fourth one of the channels indicated by a fourth one of the signal components which is based on the second scrambling sequence.

17. The receiver of claim 16, wherein the interference reduction unit comprises a second deduction unit configured to deduct the estimate of the second one of the signal components and an estimate of the fourth one of the signal components from the receive signal.

18. A receiver circuit, comprising:
at least two antenna ports configured to receive a receive signal comprising a plurality of signal components, wherein each signal component of the plurality of signal components indicates a channel of an antenna port and an associated scrambling sequence, and wherein a first one of the channels indicated by a first one of the signal components which is based on a first scrambling sequence is allocated to the receiver circuit for data reception and a second one of the channels indicated by a second one of the signal components which is based on a second scrambling sequence different from the first scrambling sequence is interfering with the allocated channel, comprising:
an interference reduction unit configured to combine an estimate of the first one of the signal components and an estimate of the second one of the signal components to provide an interference-reduced signal; and
a channel estimator configured to estimate channel coefficients of the allocated channel based on the interference-reduced signal.

19. The receiver circuit of claim 18, wherein the interference reduction unit comprises:
a first channel estimator configured to determine the estimate of the first one of the signal components based on the receive signal; and
a second channel estimator configured to determine the estimate of the second one of the signal components based on a deduction of the estimate of the first one of the signal components from the receive signal.

20. A method, comprising:
receiving a receive signal comprising a plurality of signal components, wherein each signal component of the plurality of signal components indicates a channel of an antenna port and an associated scrambling sequence, wherein a first one of the channels indicated by a first one of the signal components which is based on a first scrambling sequence is allocated for data reception and a second one of the channels indicated by a second one of the signal components which is based on a second scrambling sequence different from the first scrambling sequence is interfering with the allocated channel; and
combining an estimate of the first one of the signal components and an estimate of the second one of the signal components to provide an interference-reduced signal.

21. The method of claim 20, further comprising:
estimating channel coefficients of the allocated channel based on the interference-reduced signal.

* * * * *